United States Patent [19]
Morfill et al.

[11] Patent Number: 5,923,780
[45] Date of Patent: Jul. 13, 1999

[54] METHOD FOR DETECTING TARGET PATTERNS IN A TEXTURE REGION USING PROBABILITY DENSITIES

[75] Inventors: Gregor Morfill, München; Christoph Räth, Eching, both of Germany

[73] Assignee: Max-Planck-Gesellschaft, Munich, Germany

[21] Appl. No.: 08/915,865

[22] Filed: Aug. 21, 1997

[30]    Foreign Application Priority Data

Aug. 21, 1996 [DE] Germany .......................... 196 33 693

[51] Int. Cl.$^6$ .............................. G06K 9/46; G06K 9/66; G06K 9/00; G06K 9/20
[52] U.S. Cl. ......................... 382/195; 382/218; 382/228; 382/170; 382/282
[58] Field of Search .................... 382/195, 197, 382/205, 206, 218, 228, 170, 282, 291, 260, 274, 224, 151, 159, 128, 130, 181; 345/118, 434; 358/453, 488; 395/105

[56]              References Cited

U.S. PATENT DOCUMENTS

| 4,441,205 | 4/1984 | Berkin et al. ........................... 382/218 |
| 4,481,593 | 11/1984 | Bahler ................................... 364/513.5 |
| 4,625,289 | 11/1986 | Rockwood .............................. 364/522 |
| 5,016,173 | 5/1991 | Kenet et al. ............................ 382/128 |
| 5,220,614 | 6/1993 | Crain ........................................ 382/136 |
| 5,335,291 | 8/1994 | Kramer et al. ........................... 382/309 |

FOREIGN PATENT DOCUMENTS

4317746 A1  12/1994  Germany ......................... G06F 15/62

OTHER PUBLICATIONS

J.W. Handley et al., "Chaos and Fractal Algorithms Applied to Signal Processing and analysis", Simulations, vol. 60, No. 4, Apr. 1993.

Atmanspacher et al, "Determination of f($\alpha$) for a limited random point set" Physical Review A vol. 40, No. 7 (Oct. 1, 1989) pp. 3954–3963.

Ebeling et al, "Detecting structure in two dimensions combining Voronoi tessellation and percolation" Physical Review E vol. 47, No. 1 (Jan. 1993) pp. 704–710.

Schwenker et al, "Methoden zur Clusteranalyse und Visualisierung hochdimensionaler Datenmengen" DAGM Symposium (Sep. 13–15, 1995) pp. 547–553.

Primary Examiner—Bipin Shalwala

[57]             ABSTRACT

In a process for detecting target patterns in a texture with which a system state can be represented as a distribution of points in an n-dimensional space, anisotropic scaling factors $a_{ji}$ are determined which are characteristic of the relationship between the projection of the point density onto coordinate j and the distance to examined point $P_i$. A target is detected if the distribution of scaling factors deviates from predetermined comparison distributions of systems without target patterns.

5 Claims, 9 Drawing Sheets

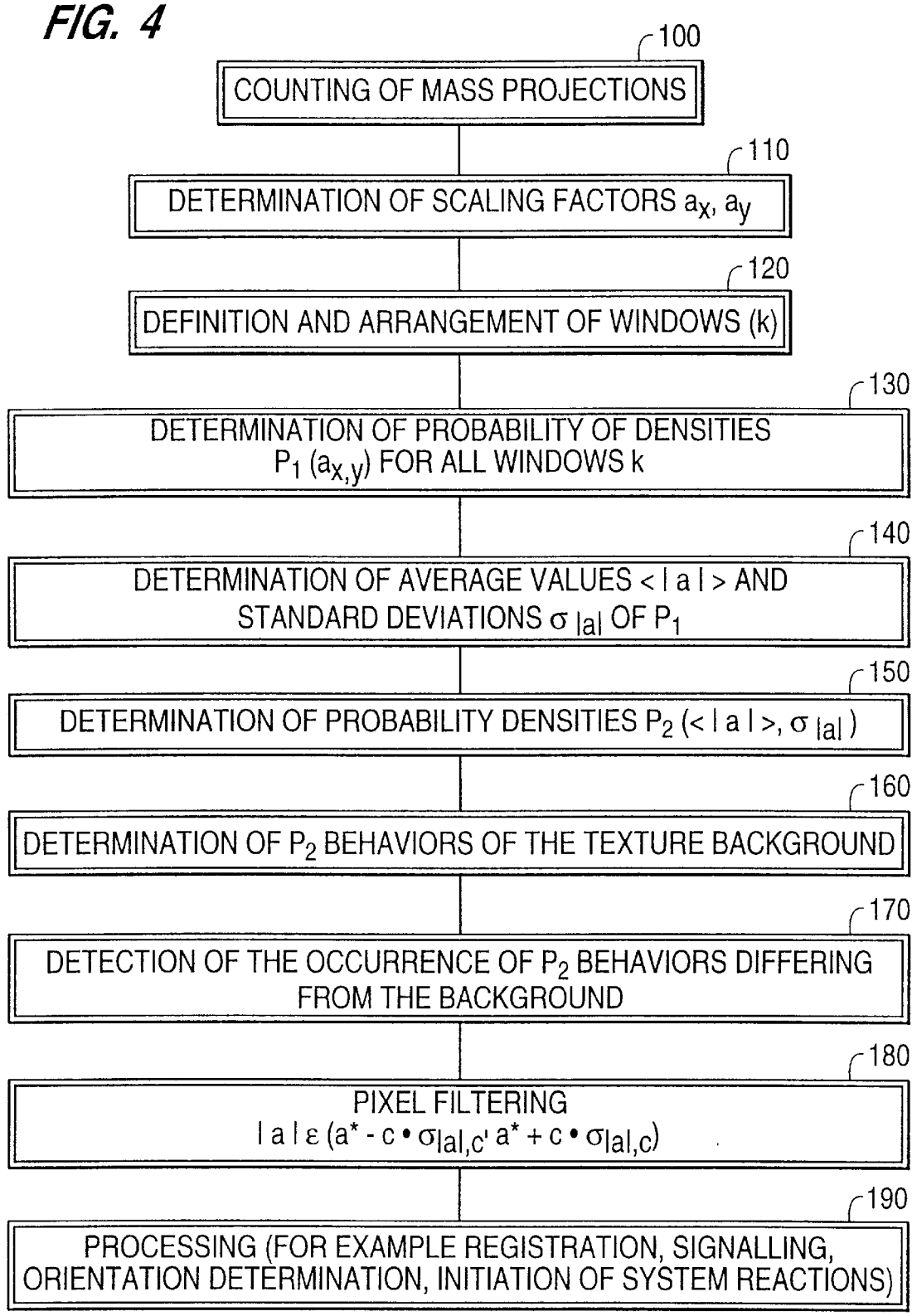

FIG. 8(a)
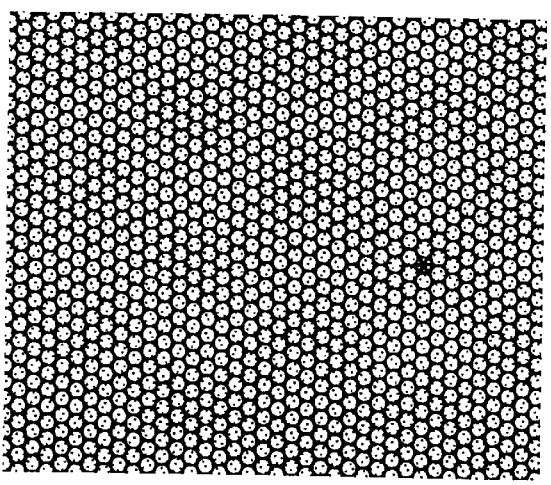
FIG. 8(b)
*
FIG. 8(c)
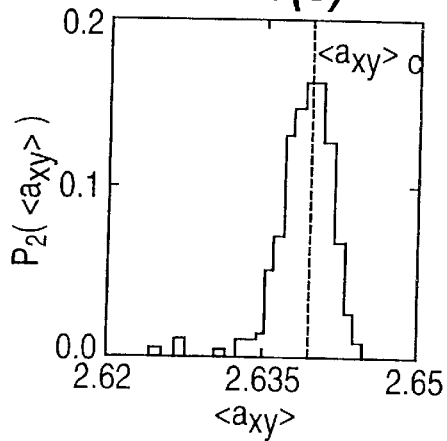
FIG. 8(d)
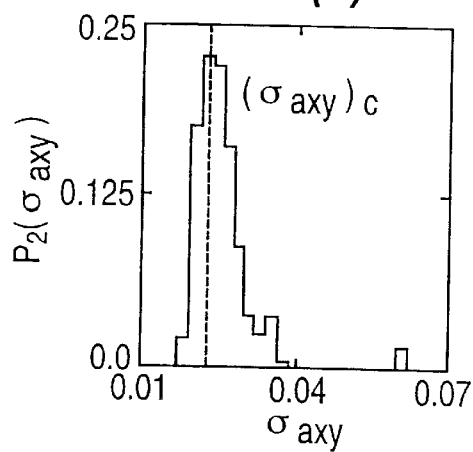
FIG. 8(e)
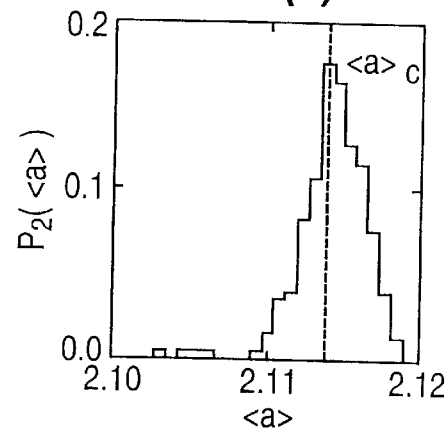
FIG. 8(f)
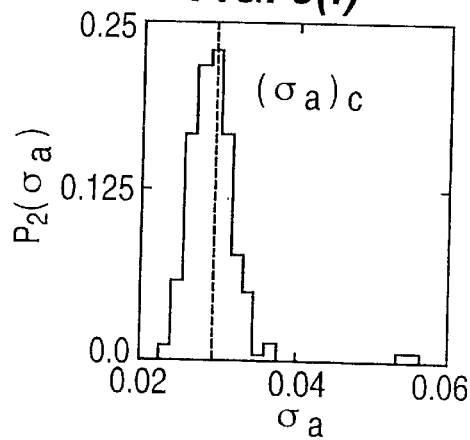

METHOD FOR DETECTING TARGET PATTERNS IN A TEXTURE REGION USING PROBABILITY DENSITIES

BACKGROUND OF THE INVENTION

This invention relates to a process for pattern detection in static or dynamic systems.

The systems contemplated herein encompass, in the broadest sense, all physical, chemical or bio-medical processes or materials with a state or individual features which can be characterized with a set of n parameters. The systems can be invariable (static) or variable over time (dynamic) in the study interval. In the case of dynamic systems, time is one of n parameters.

The characterizing parameters are formed either by system-imminent or by externally induced physical or technical features. They can comprise especially geometric arrangements, time arrangements or amplitude variations of certain physical or technical quantities.

Various processes for recognizing structures (patterns) in n-dimensional spaces are known. They include, for example, local search processes for density fluctuations, the so-called maximum entropy process and the so-called maximum likelihood process. However, these known processes require assumptions or prior information to be able to identify structures or patterns. Another deficiency of known methods is that expansion to more than two dimensions is very computer-intensive, that nonuniform measured quantities and many different correlations cannot be processed, and that the sensitivity in irregular patterns with strong uncorrelated disruptions is low. Furthermore, the publication of H. Atmanspacher et al. (PHYSICAL REVIEW A, vol. 40, no. 7, October 1989, USA, pages 3954–3963 "Determination of F(alpha) for a Limited Random Point Set (Galaxy Distribution)") discloses a process in which, by determining the F spectrum in a predominantly uncorrelated set of points, possibly present correlated subsets can be identified.

Another process is known from the publication of H. Ebeling et al. (PHYSICAL REVIEW E, vol. 47, no. 1, January 1993, USA, pages 704–710 "Detecting Structure in Two Dimensions Combining Voronoi Tessellation and Percolation"). In this process, the original data point field is divided into individual cells and the cell distribution is compared to the one which would have been expected in a statistical Poisson distribution.

A simplified and more reliable approach to pattern recognition in n-dimensional space is the space filter process described in DE-OS-43 17 746. Here, the system state is represented by a point distribution in the state space (n dimensions). The change of point density (gradient) around a studied point is described by isotropic scaling factor a, which is a measure for the surrounding number of points depending on the distance from the studied point. According to the known process, the difference of the frequency distribution of all a-values of the studied points and the frequency distribution of the a values of a reference state is used to recognize local density fluctuations.

However, this known space filter process has the following defects. Using the process, structures can only be detected in the state space without the possibility of classifying its orientation. Thus, comparison with predetermined searched structures and, thus, location or signalling of certain states in state space are not possible either. This process is therefore limited to applications especially in image processing. Moreover, structure recognition according to the known process can be inaccurate in cases in which local density fluctuations are "smeared" over spatial areas which are much larger than the environment considered in the study of one point. Measurement and recognition of these blurred edges of image structures are occasionally faulty, so that a subsequent indication of pattern occurrence can be unreliable.

Finally, conventional procedures for detecting system states, especially for recognizing faulty structures, are known in systems in which the existence of a fault is detected by a global process and is then located by local studies. This is frequently impractically time consuming. This especially applies in applications for state detection of a host of systems, for example, in mass production.

SUMMARY OF THE INVENTION

An object of the invention is to provide an improved process for detecting patterns or system states with which the defects or limitations of conventional processes are surmounted and which allows broad extension to many technical applications.

In addition to the change of point density in the vicinity of the studied points, the directional dependency of the point density change is incorporated into state detection. More comprehensive and accurate information evaluation is thus possible and technical applicability is extended to a variety of systems.

The studied systems can encompass not only image patterns, but also, for example, materials, mechanical devices, and biological systems. Image processing encompasses, in the broadest sense, the processing of feature patterns which conventionally occur in two- or more-dimensional mapping or in the time variation of signal amplitude. Detection of a system state, depending on the application, encompasses measures of actuator engineering, sensor engineering, analysis and registration or signalling. The optionally necessary actuator engineering comprises measures for generating system reactions which are representative of characteristic states. They include, for example, the excitation of mechanical vibrations in a study object or measures to form evoked potentials in the study of neurological systems. Sensor engineering comprises detection of all system features with reference to n parameters of interest and the representation of features in n-dimensional space. This representation comprises, for example, storage of suitable n-tuples which are assigned to the features.

According to the present invention, for each point identified by an n-tuple in state space, one or more scaling factors are detected, each of which are assigned to one of n dimensions, and each of which originate from the projection of the point number in the vicinity of a studied point onto the n-th coordinate axis in state space. According to one preferred embodiment, the portions of the projected point number, with reference to the coordinate intervals, which lie above or below adjacent to the n-th coordinate of the study point are differentiated.

BRIEF DESCRIPTION OF THE DRAWINGS

Embodiments of the invention are explained in the following with reference to the attached figures.

FIG. 4 is a flow chart of the process according to the present invention, according to a first embodiment, FIGS. 8(a)–8(f) show an example of a real texture with a target pattern, probability densities $P_2$ referenced to an isotropic scaling factor, and probability densities $P_2$ referenced to a combined scaling factor.

DESCRIPTION OF THE PREFERRED EMBODIMENT(S)

Figure 1A:
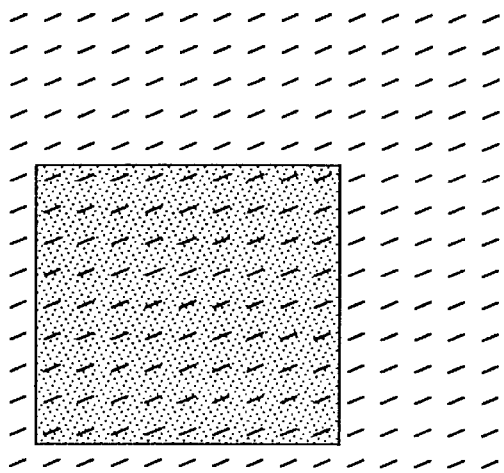
FIGS. 1(a)–1(d) show examples to illustrate a homogenous texture (left) and statistical texture (right) with the corresponding distribution functions of scaling factor $a_y$.

First, determination of scaling factors according to the present invention, then illustrative examples of the present invention in an image processing application, are described below.

The point of departure for determining the anisotropic scaling factors is the determination of isotropic scaling factor a, known from the aforementioned space filter process. The determination of isotropic scaling factor a and anisotropic scaling factors $a_{j,i}$, according to the present invention, is described below using the example of a pixel image G (x,y) of size N*M. A gray-scale value g (x,y) (g from 0 to 255) is assigned to each pixel. Thus, each pixel comprises one piece of local and gray-scale information which can be summarized in one three-dimensional vector $p_i=(x_i, y_i, g_i)$ Here, gray-scale value $g_i$ is normalized if necessary to obtain an amount comparable to the x and y coordinates.

To determine the scaling factors, two cubes of different size ($d_1^3, d_2^3$, $d_1<d_2, d=d_2-d_1$) are arranged concentrically around each point ($p_i$). Due to the difference of the two cubes, a certain space is placed around each point. In this space, the ambient points which belong to examined point ($p_i$) are counted. The total number of ambient points which fall in this space is called the total mass $M_i$.

Quantity $d=d_2-d_1$ is the width of the coordinate interval placed concentrically around the examined point. The sizes and locations of $d_1$ and $d_2$ are suitably chosen, depending on the specific application. This can be done, for example, by a function which represents the relationship between the point number in the vicinity of ($p_i$) and the dimensions of the vicinity being determined for each point ($p_i$). As suitable parameters $d_1$ and $d_2$, then, ambient dimensions (interval limits) are selected for which the scaling factors (determined as follows) yield exponents of distance-power functions which approximate these distance functions as closely as possible. But alternatively, it is also possible to suitably select the location and width of the examined vicinity interval depending on the case, for example, with consideration of computer processing of the examined points made as simple as possible or the like. It is also possible for the vicinity interval to be chosen separately for each coordinate. This will be especially necessary when the n-dimensional space for describing a system state has not only space coordinates, but also other system parameters (for example, gray-scale values, oscillation amplitudes, or the like) as additional coordinates.

To determine isotropic scaling factor $a_i$ the logarithmic derivation of the total mass $M_i$ is computed (compare equations (1) and (2)).

$$a_i = \frac{\log(M_i(d_2)) - \log(M_i(d_1))}{\log d_2 - \log d_1} \quad (1)$$

with $$M_i(d) = \sum_{j=1}^{N \cdot M} \theta\left(\frac{d}{2} - \|\vec{p}_i - \vec{p}_j\|_\infty\right) \quad (2)$$

$\theta$ is the jump function (Heaviside function) and the second summand in equation (2) labels the respective distance of examined point $p_i$ from any other point of the pixel image. Isotropic scaling factor $a_i$ is simply one measure of the radial gradients of the surrounding point numbers.

To detect the directional dependency of the radial gradient, the determination of anisotropic scaling factors is now introduced in accordance with the present invention. Here, in turn, the surrounding points which fall in the space between the aforementioned cubes are counted. Instead of total mass $M_i$, however, projections of total mass $M_{xi}$ (d) and $M_{yi}$ (d) onto the x and y directions, respectively, are determined. According to one special embodiment, the mass projections onto one coordinate axis at a time are additionally divided into parts which fall on the positive and negative side of examined point $p_i$. Thus, in following equations (3) through (10) $M_{xi}$ (d) and $M_{yi}$ (d) denote the projections of the total mass onto the x and y directions. $M^+_{xi}$ and $M^-_{xi}$ (or $M^+_{yi}$ and $M^-_{yi}$) denote the mass projections onto the positive and negative side of the x and y directions relative to point ($p_i$).

$$a_{xi} = \frac{\log(M_{xi}(d_2)) - \log(M_{xi}(d_1))}{\log d_2 - \log d_1} \text{sgn}(M^+_{xi} - M^-_{xi}) \quad (3)$$

$$a_{yi} = \frac{\log(M_{yi}(d_2)) - \log(M_{yi}(d_1))}{\log d_2 - \log d_1} \text{sgn}(M^+_{yi} - M^-_{yi}) \quad (4)$$

$$M_{xi}(d) = \sum_{j=1}^{N \cdot M} \theta\left(\frac{d}{2} - |x_i - x_j|\right)\theta\left(\frac{d_2}{2} - \|\vec{p}_i - \vec{p}_j\|_\infty\right) \quad (5)$$

$$M_{yi}(d) = \sum_{j=1}^{N \cdot M} \theta\left(\frac{d}{2} - |y_i - y_j|\right)\theta\left(\frac{d_2}{2} - \|\vec{p}_i - \vec{p}_j\|_\infty\right) \quad (6)$$

$$M^+_{xi} = \sum_{j=1}^{N \cdot M} \theta(x_j - x_i)\theta\left(\frac{d_2}{2} - \|\vec{p}_i - \vec{p}_j\|_\infty\right) \quad (7)$$

$$M^-_{xi} = \sum_{j=1}^{N \cdot M} \theta(x_i - x_j)\theta\left(\frac{d_2}{2} - \|\vec{p}_i - \vec{p}_j\|_\infty\right) \quad (8)$$

$$M^+_{yi} = \sum_{j=1}^{N \cdot M} \theta(y_j - y_i)\theta\left(\frac{d_2}{2} - \|\vec{p}_i - \vec{p}_j\|_\infty\right) \quad (9)$$

$$M^-_{yi} = \sum_{j=1}^{N \cdot M} \theta(y_i - y_j)\theta\left(\frac{d_2}{2} - \|\vec{p}_i - \vec{p}_j\|_\infty\right) \quad (10)$$

In equations (5) through (10) it is established by the second Heaviside factor that only points within the outer cube are considered. The signum function establishes the sign of the anisotropic scaling factor according to the mass gradient in the respective direction.

The aforementioned equations relate, for example, to the aforementioned pixel image. These considerations can be expanded in the following manner to any point distributions. The determination of anisotropic scaling factors is not fixed onto the x and y direction. Depending on the specific application, another suitable coordinate system can be chosen. It is even possible to select, for each point, a local coordinate system which can be aligned differently from point to point. Thus, for example, in the detection of images of objects with essentially round edges, the local coordinate system for each point may be aligned in a certain way with reference to a tangent of the object edge. For example, one axis of a rectangular coordinate system can be selected to be essentially parallel to the tangent. In these image detections it is advantageously possible, based on the ascertained distribution of scaling factors (see below), to distinguish sharp and diffuse edges from one another. Furthermore, the introduction of third anisotropic scaling factor $a_{g,i}$ is possible. This third scaling factor $a_{g,i}$ can be determined analogously to $a_{x,i}$ and $a_{y,i}$ with reference to the gray scale (as the third coordinate). Finally, complex scaling factors can also be formed from a host of scaling factors which each relate to individual coordinates. One example of this combined scaling factor is described with reference to FIGS. 8(e) and 8(f).

For each point of the studied system, the indicated approach yields a set of anisotropic scaling factors. Each set can comprise a maximum of n anisotropic scaling factors if n is the number of parameters for describing the system. How many and which of the anisotropic scaling factors are, in fact, determined, depends on the specific application. In addition to the anisotropic scaling factors, the above described isotropic scaling factor or a combined scaling factor (compare FIG. 9) can be assigned to each point.

In the continuing process for detection of the state of a system the set of all examined scaling factors is evaluated. Frequency distributions or probability densities of the scaling factors are detected. Thus, for example, probability density $P_1$ for the occurrence of certain values of scaling factors can be represented using equation (11).

$$P_1(a,d_1,d_2)da = \text{Prob}(a_i(d_1,d_2) \in [a, a+da]) \tag{11}$$

where $$a_i(d_1,d_2) \in \{a_i, a_{xi}, a_{yi}\}$$

The frequency distribution or probability density is referenced each time to the totality of examined points of the system or a subset of this totality. The system state is then detected after comparison of the frequency distribution(s) with reference distributions by registering and/or signalling predetermined deviations. In doing so, the reference distributions can be referenced to a reference system or to frequency distributions of the examined system which each relate to another subset of the overall point set. Which measures for evaluation (i.e., comparison, registration and/or signalling) are taken depends on the specific applications. In the following, applications of the process according to the present invention in image processing are described as examples.

According to a first embodiment, the process is used to detect, in an image formed by a host of identical micropatterns, the orientation of the micropatterns. The totality of micropatterns forms a texture. In a homogenous texture, all micropatterns are oriented in the same manner. In the case of a statistical texture orientation, differences occur between the individual micropatterns. One system state (especially a space or time image) is determined by a predetermined homogenous or statistically arranged texture. Changes of the system state can be registered and, if necessary, signalled (or displayed) by the determination of the deviations from the predetermined texture and their location.

This sample application is described with reference to FIGS. 1–8. But the invention is not limited to the micropatterns shown.

Figure 1C:
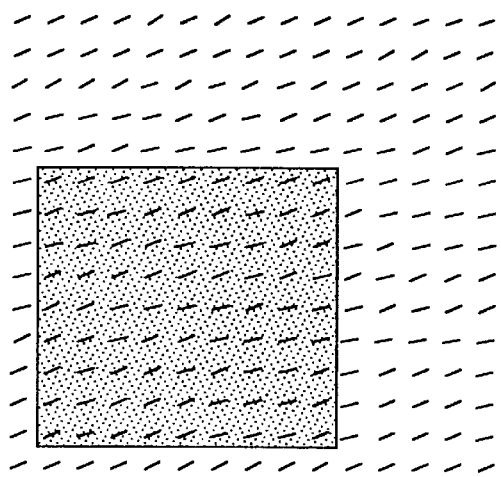
Figure 1B:
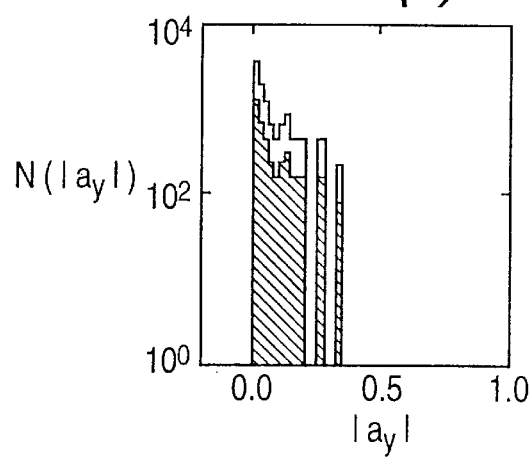
Figure 1D:
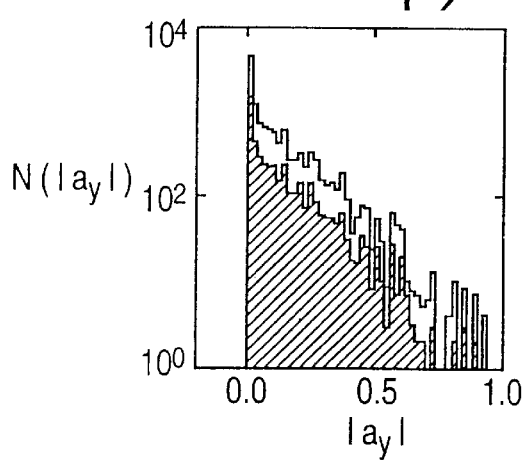
Figure 2A:
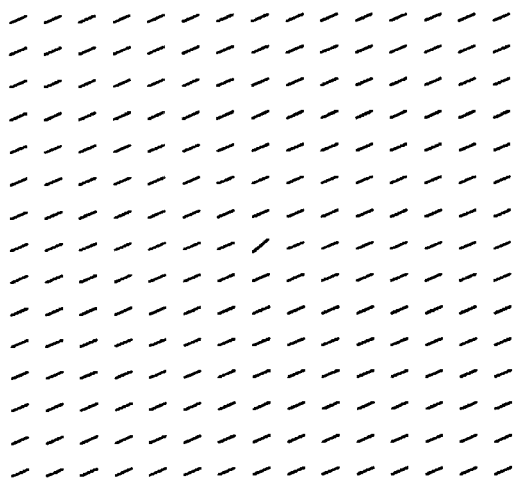
FIGS. 2(a)–2(d) show texture examples as shown in FIG. 1 in which however a target pattern occurs in the respective field center.
Figure 2C:
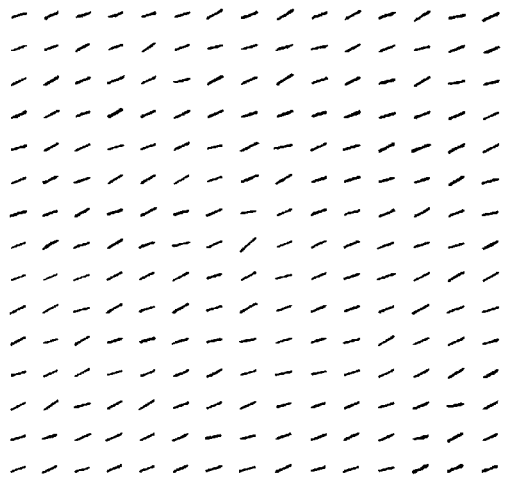
Figure 2B:
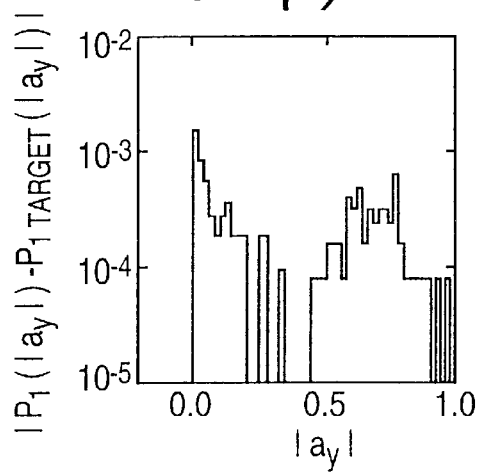
Figure 2D:
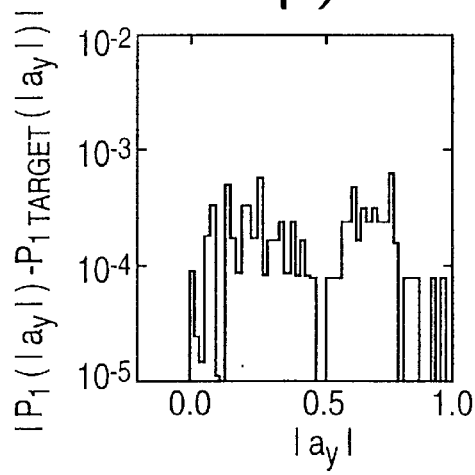

FIGS. 1(a) and 1(b) show examples of a homogenous texture and FIGS. 1(c) and 1(d) show examples of a statistical texture. Each overall image of size N*N (N=510) contains m micropatterns (m=225) which are each represented by a n*n matrix (n=17). These micropatterns are arranged lattice-like with a center-to-center distance of 2 n. In each micropattern is a line segment. The incline of the line segment is 22.5° to the x-axis. In the statistical case, the dispersion is ±10°.

For each of the N*N points the anisotropic scaling factors are determined. In doing so, dimension $d_2$ of the larger unit (aforementioned "cube") is chosen to be preferably smaller than distance 2 n between the micropatterns in order to detect only local properties with the anisotropic scaling indices. In the calculations for the examples, $d_2=19$ was chosen. The black pixels within a micropattern which form the line segments are counted in determining the mass projections. In the sample case of line segments, the micropatterns are point-symmetrical so that the frequency distributions of the anisotropic scaling factors $a_x$ and $a_y$ are symmetrical to zero. In any case, the orientation of the line segments is detected by the absolute values of $a_x$ and $a_y$ which are shown in FIGS. 1(b) and 1(d).

FIGS. 1(b) and 1(d) show that scaling factor $a_y$ in the homogenous case has a relatively narrow distribution, and in the statistical case a relatively wide distribution. In addition, it can be recognized that for a subrange (cross-hatched portions of FIGS. 1(b) and 1(d)), the frequency distribution of the scaling factor in the homogenous case remains essentially the same, but changes in the statistical case.

FIGS. 2(a)–2(d) are similar to FIGS. 1(a)–1(d) but with the difference that a micropattern with an altered orientation (angle of incline 45°) is shown. It can be recognized that a deviation of the scaling factor distribution is formed by the deviating micropattern. In both the homogenous and in the statistical texture the frequency distributions have double peaks. In the statistical case, however, the width of the two peaks are increased.

Figure 3A:
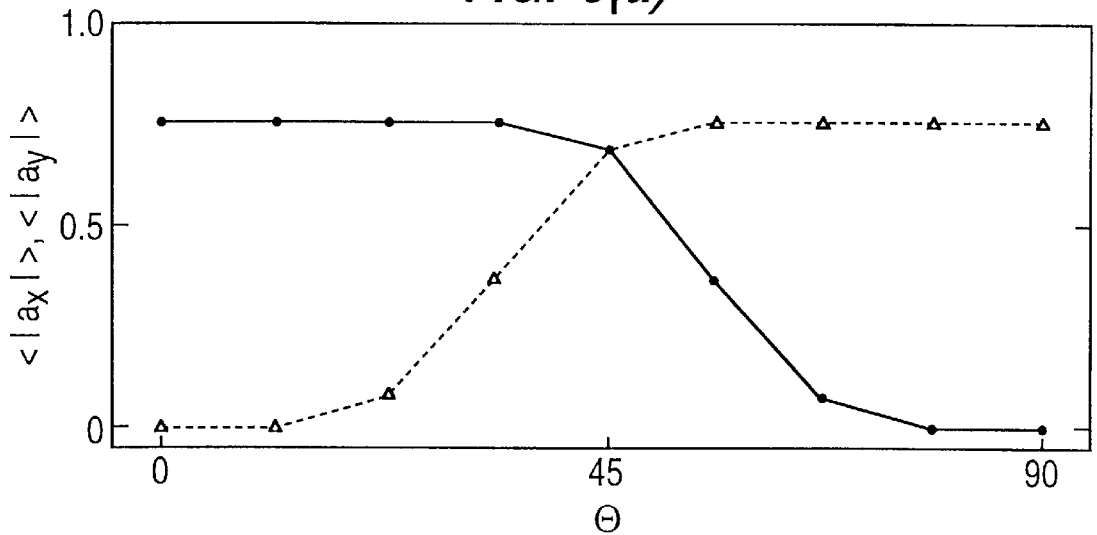
FIGS. 3(a)–3(b) show the curves of the expected value and standard deviation of the probability densities $P_1$ as a function of the incline of the micropatterns, as shown in FIGS. 1 and 2.
Figure 3B:
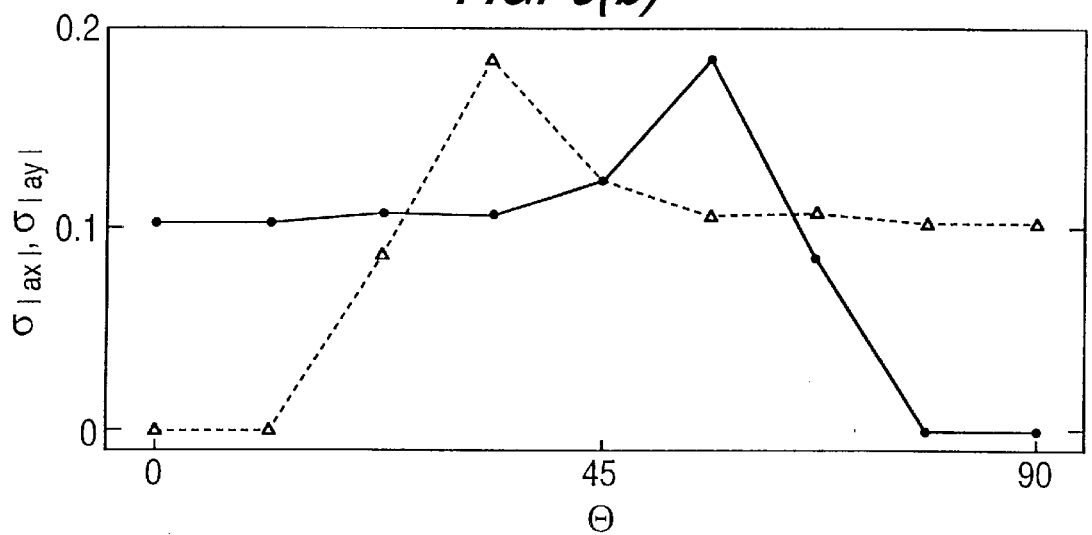

It was ascertained that the probability density $P_1$ of the anisotropic scaling factors determined according to the present invention has the properties shown in FIGS. 3(a) and 3(b). Computations have shown that the average and the standard deviation of the probability density are dependent on the angle of incline of the line segments relative to the x-axis. For a homogenous texture, FIGS. 3(a) and 3(b) show the average value and standard deviation, respectively, as a function of the angle of incline θ. The solid and broken curves are each related to the properties of $a_x$ and $a_y$. In contrast to the monotonic behavior of the average value, the standard deviation has extreme values at angles of incline of roughly 60° and 30°. At this angle of incline, the projection of the line segment onto the x direction falls entirely within inner dimension $d_1$ with reference to a point in the middle of the segment. This is a maximum gradient of the total masses between the inner and outer "cube". When the angle of incline rises, the mass projection for pixels is at the end of the line segment within dimension $d_1$.

If the texture is superimposed by noise, in this way the average value is not decisively changed, but the standard deviation is increased with increasing dispersion $\Delta\theta$ in the angles of incline of the micropatterns.

Proceeding from the findings explained with reference to FIGS. 1 through 3, in the following a process according to the present invention for detecting and locating texture gradients is given. This process is explained further with reference to the example of the line segments. Since for this the average value and the standard deviation for scaling factors $a_x$ and $a_y$ are point symmetrical with reference to an angle of incline of 45°, in the following only one of scaling factors $a_x$ or $a_y$ is examined, depending on whether the incline is less than or greater than 45°. For the sake of simplification, therefore, the subscript x or y is omitted if it is not necessary for differentiation. The approach can be extended to any texture in the process of space or time images.

A studied system has a texture which has either homogenous or statistically oriented line segments. Different system states have different textures, which differ with reference to the angles of incline. A target is a structure (or a pattern area) in which, relative to a comparison texture, a change of the angle of incline has occurred. The detection process starts with the assumption that each target forms a significant deviation from the probability density $P_1$ of the remaining texture. In this connection, the term "typical" means that the respective probability density is representative for most parts of the system. These parts are also called "background texture".

The approach according to the present invention for detecting and locating texture gradients or targets is described with reference to the general overview in FIG. 4, and the illustration of details in FIGS. 5(a)–5(d) through 8(a)–8(f).

First of all, after measuring the image which describes one system state, the above explained mass projections are counted (100) and the anisotropic scaling factors computed therefrom (110). Then windows of size k*k pixels are defined and a host of these windows are placed with a predefined interval periodically on the image (120). For the sample values given with reference to FIGS. 1 and 2, the window interval is 34 pixels. The host of windows forms a "sliding window". Quantity k of the window is chosen depending on the properties of the texture such that, in the texture, the statistical fluctuations of the average value of the scaling factors as a result of the finiteness of the examined sample is much less than the standard deviation. Under the conditions given as the example, k=170. Then, for each window, probability densities $P_1$ of scaling factors $a_x$ and $a_y$ are computed (130). For all probability densities $P_1$ of each window, the average value (or expected value) and the standard deviation are determined (140). Then probability densities $P_2$ are determined using equations (12) and (13) for these latter values (150).

$$P_2(<|a|>)d<|a|>=\text{Prob}(<|a|>_i(a_1,a_2)\epsilon[<|a|>,<|a|>+d<|a|>]) \quad (12)$$

$$P_2(\sigma_{|a|})d\sigma_{|a|}=\text{Prob}(\sigma_{|a|i}(d_1,d_2)\epsilon[\sigma_{|a|},\sigma_{|a|}+d\sigma_{|a|}]) \quad (13)$$

Here $<|a|>_i$ ($d_1$, $d_2$) is the average value of $P_1$ for window i, and $\sigma_{|a|i}$ ($d_1$, $d_2$) is the corresponding standard deviation. If, as indicated above, quantity k is chosen in a suitable manner, the probability densities $P_1$ for the different windows is the same. Therefore, the average values and standard deviations of the distributions of $P_1$ are each roughly equal to the individual values given in equations (14) and (15).

$$<|a|>_i(d_1,d_2)\approx<|a|>_c(k)\forall i \quad (14)$$

$$\sigma_{|a|i}(d_1,d_2)\approx\sigma_{|a|c}(k)\forall i \quad (15)$$

At a given k-value, probability densities $P_2$ each form an individual symmetrical peak at values $<|a|>_c$ and $\delta_{|a|c}$.

Based on the above explained two-stage statistics, both homogenous and statistical textures without a target are described in the same way by probability densities with one peak each (corresponding to the determination of $P_2$ (160)). If one target appears, diverging distributions are found (170). The deviation depends on window size k and the micropattern density. The window size determines the frequency ratios of the windows which contain a target to the windows with a clean background. The interval of the peaks of the distributions of $P_2$ from the typical background value decreases as the window size increases. If the windows are too large, all windows contain at least one target so that the background peak disappears. FIGS. 5(c), 5(d), 6(c), and 6(d) show probability densities $P_2$ (<|ay|>) and $P_2$ ($\delta|a_y|$) for a homogeneous texture with five targets. Here, the background texture and the targets have angles of incline of 22.5 and 45° respectively.

Figure 5A:
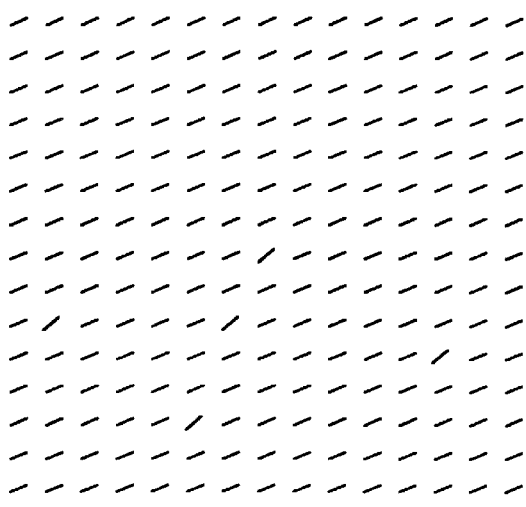
FIGS. 5(a)–5(d) show probability densities $P_2$ for a homogenous texture with five target patterns.
Figure 5B:
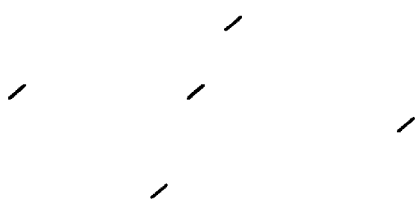
Figure 5C:
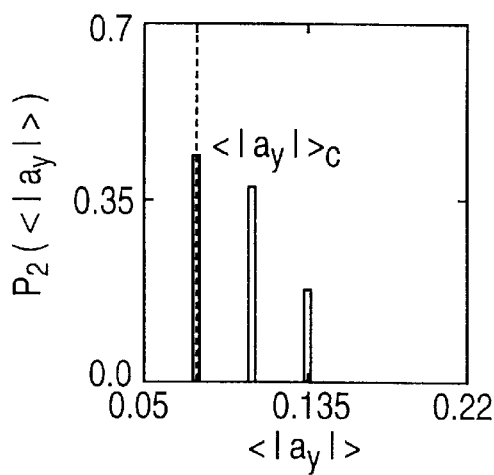
Figure 5D:
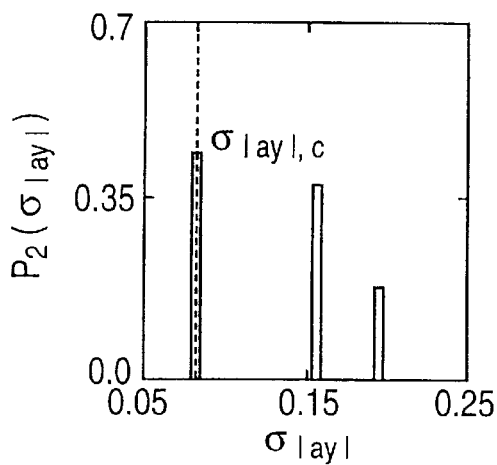
Figure 6A:
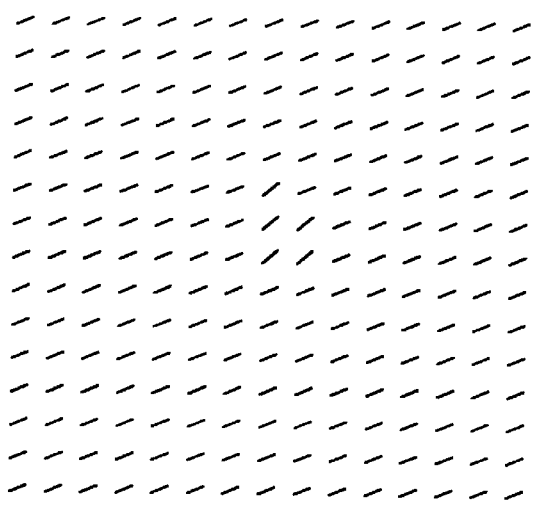
FIGS. 6(a)–6(d) show the probability densities according to FIG. 5, but with the target patterns being grouped in the center of the field.
Figure 6B:
Figure 6C:
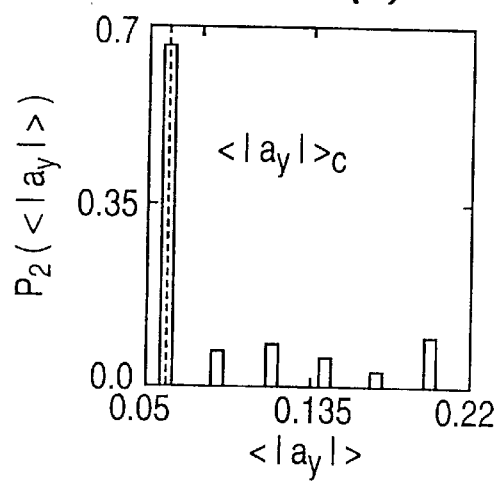
Figure 6D:
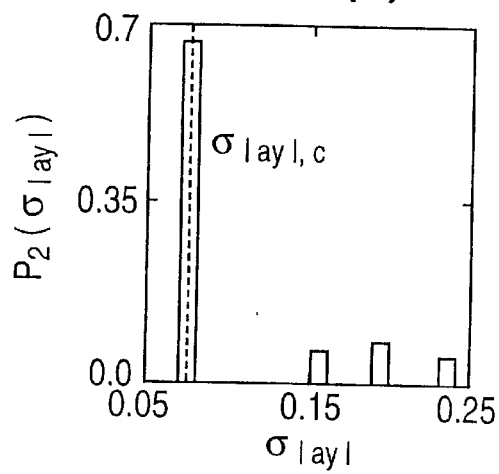
Figure 7A:
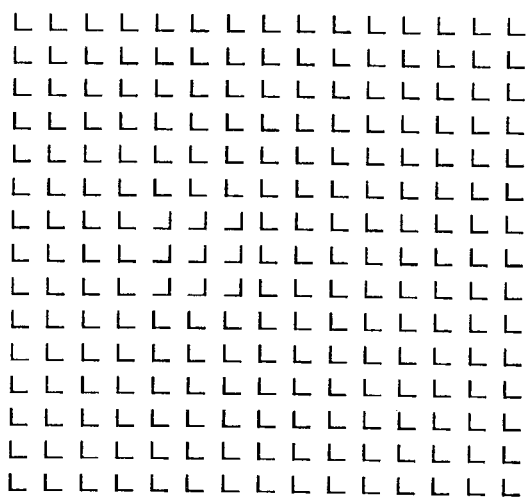
FIGS. 7(a)–7(d) show an example of another texture, the target pattern detected according to the present invention, and probability densities $P_2$.
Figure 7B:
Figure 7C:
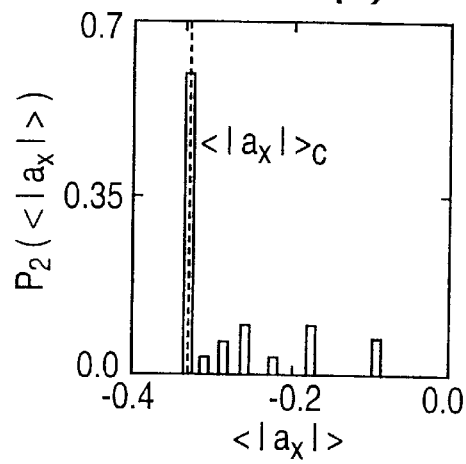
Figure 7D:
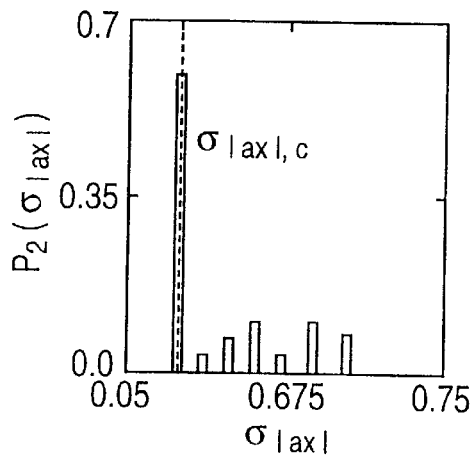

In another step of the process, the targets are located. The average value and the standard deviations according to the main peaks in FIGS. 5(c), 5(d), 6(c), and 6(d) are used to define the a-region of original distribution $P_1(a)$ which belongs to the background pixels. This a-region can be formed, for example, by a strip of c-fold width of the standard deviation according to equation (15) around the average value according to equation (14). Constant c can be 3, for example. All pixels with a value within the strip are recognized as belonging to the background, while pixels with a values outside of the strip form the targets (180). Results of this filter process are shown in FIGS. 5(b) and 6(b). We find that both the average value and the standard deviation according to equations (15) and (16) are suitable as the criterion for detecting the target (and texture gradients or structures). In addition, FIGS. 6(a)–6(d) show that when different targets are grouped, detection is facilitated.

Alternatively, it is possible to define the filter region for target location, not with reference to the aforementioned average value, but with reference to a suitably chosen reference scaling factor $a^*_{ij}$. Thus, for example, the filter range can be placed around a certain extreme value of $P_1$ distributions.

Finally, the coordinates of the pixels for which a target has been recognized are registered and processed depending on the application. This processing can, for example, encompass display of the detected target, signalling, initiation of a system reaction or determination of target orientation (190).

Orientation determination, however, presupposes that the relationship between the average values and standard deviations of the a-values of the angles of incline is known. This relationship differs for different micropatterns which have a form other than the line segments shown above by way of example.

FIGS. 7(a)–7(d) show the application of the process according to the present invention in a micropattern with a more complex structure. According to FIG. 7(a), the background texture is composed of a plurality of L's. The target micropatterns are reflected accordingly. The frequency distributions of the isotropic scaling factors are identical for both types of micropatterns. But the frequency distribution of the $a_x$ values (mass projections) can cancel the "degeneration" of the micropattern, enabling differentiation between the background and target micropatterns. In this case, it is enough to execute the process simply using scaling factor $a_x$. According to FIGS. 7(c) and 7(d), probability densities $P_2$ deviate from the individual peak distributions, which indicates that there are target micropatterns in the image. Thus, target detection can be done relatively easily. Differentiation (or location) is, however, more difficult than in the aforementioned example of line segments. If the aforementioned strip filtration is done, for example, with c=2, the horizontal parts of the target and background micropatterns are detected. Alternatively, only all pixels for which scaling factor $a_x$ is above the width of the filter strip are selected. In the latter case, at least parts of the target micropatterns can be filtered out (see FIG. 7(b)).

In the following, the approach according to the present invention is explained using the example of the textures of a real object, with reference to FIGS. 8(a)–8(f).

Images of real objects show intensity variations (pixel gray-scale values). These intensity variations form micropatterns which in turn represent textures in their entirety. The local features of the micropatterns are characterized by the frequency distributions of the scaling factors (isotropic or anisotropic).

The test image as shown in FIG. 8(a) shows a texture which is formed by micropatterns which consist of white points. The white points all have almost the same peak gray-scale values and gray-scale value profiles. The points are periodically arranged in a lattice. A texture defect is formed at a position where there is no lattice point. This texture defect is detected and located by applying the approach according to the present invention by using isotropic scaling factor a or anisotropic scaling factors $a_x$ and $a_y$.

First, the frequency distribution of isotropic scaling factors a for a sample of windows (k=60) which are arranged with an interval of 30 pixels on the lattice (570*570 pixels) is computed ($d_1$=21, $d_2$=61). FIGS. 8(c) and 8(d) show the corresponding average values and standard deviations of probability densities $P_2$. Both probability densities deviate from the individual peak distributions with which the existence of a defect in the texture is displayed.

For certain windows, the a value has an especially low or high value. These windows contain the texture defect. The task of location of the texture defects is executed by selecting all strips according to the aforementioned filtration, here the value c=6 being used (see FIG. 8(b)).

The same detection and location process is executed for the test image using quantity $a_{xy}=\sqrt{a_x^2+a_y^2}$ (see FIGS. 8(e) and 8(f)). Probability densities $P_2$ of the average values and the standard distributions of the windows show the same behavior as in the isotropic case, however, the windows with the texture defects exhibit a stronger deviation of the sizes of the average values and standard deviations from the peak values (see FIGS. 8(e) and 8(f)). The texture defect can thus be located in turn with the filtration process, here a value of c=9 being used.

Figure 9:
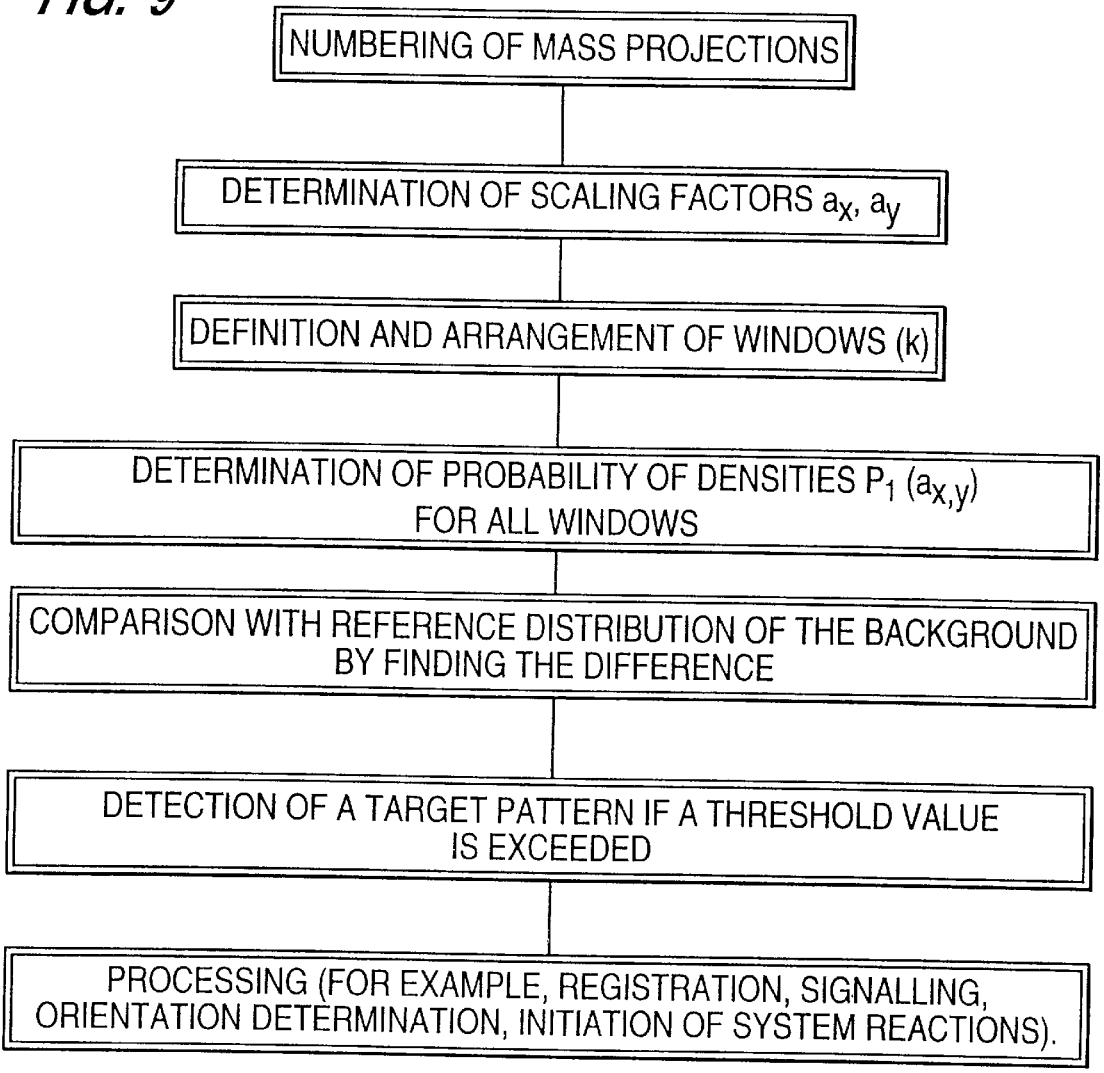
FIG. 9 is a flow chart of the process according to the present invention, according to a second embodiment.

According to a second embodiment, the process according to the present invention is used to detect, in an image which is formed by a certain texture (background texture), the occurrence of target patterns which differ from the background texture. The corresponding process steps are shown in FIG. 9.

In the second embodiment, in contrast to the first, the host of frequency distributions (or probability densities) $P_1$ is not placed in a relation among one another. However, but one or more distributions $P_1$ are compared to a corresponding frequency distribution of a reference system which has only the background texture. In this example, preferably only one window is formed which comprises the entire point distribution. This comparison is formed for example by finding the difference between each frequency distribution $P_1$ and the reference distribution. If as a result of finding the difference, a threshold value is exceeded, it is recognized that a target pattern exists in the studied texture. In another process step, this target pattern detection continues to be processed by registration, signalling and/or display. A target can be located via detection of the windows in which the threshold value is exceeded.

The process according to the present invention can finally comprise steps in which the parameters of the detected target patterns are registered, signalled and/or displayed.

What is claimed is:

1. A process for detecting target patterns in a texture with which a system state can be represented as a distribution of points ($P_1$) in an n-dimensional space, the process comprising the steps of:

a) for each point ($p_i$) having coordinates ($x_{1,i} \ldots x_{n,i}$) determining at least one point number $M_{ji}(d_2)$, which comprises all points at the time, with coordinate j in an interval [$x_{ji}+d_2$, $x_{ji}-d_2$], and determining at least one point number $M_{ji}(d_1)$ with coordinate j in an interval [$x_{ji}+d_1$, $x_{ji}-d_1$], wherein $d=d_2-d_1$ is a width of an interval about coordinate ($x_{j,i}$) of point ($p_i$)

b) for each point ($p_i$), determining at least one scaling factor $a_{ji}$ such that $$a_{ji}=[\log M_{ji}(d_2)-\log M_{ji}(d_1)]/[\log d_2-\log d_1],$$

c) determining a plurality of windows of size k which each comprise a subregion of the distribution of points $p_i$, d) for said plurality of windows, determining a plurality of probability densities $P_1$ ($a_{ji}$) for each said scaling factor $a_{ji}$ accordingly, e) determining at least one of an average value and a standard deviation of each said probability density $P_1$ ($a_{ji}$), and f) identifying an occurrence of a target pattern if probability density $P_2$ of at least one of said average value and said standard deviation deviates from a reference texture comparison value.

2. The process as claimed in claim 1, wherein said step of identifying an occurrence of a target pattern comprises the steps of:

g) defining filter regions around reference scaling factor $a^*_{ji}$ of a reference comparison texture, and h) detecting all points ($p_i$) which have scaling factor $a_{ji}$ which lie in one of said filter regions.

3. The process as claimed in claim 1, wherein each point number $M_{ji}(d_2)$ and $M_{ji}(d_1)$ comprises two partial numbers $M^+_{ji}(d_2)$, $M^-_{ji}(d_2)$, $M^+_{ji}(d_1)$, and $M^-_{ji}(d_1)$, respectively, which each comprise all points with coordinate j which falls in the interval of width d above and below coordinate ($x_{n,i}$), and wherein said steps b) through h) are performed for each of said partial numbers.

4. A process for detecting target patterns in a texture in which a system state can be represented as a distribution of points ($p_i$) in an n-dimensional space, comprising the following steps:

a) for each point ($p_i$) with coordinates ($x_{1,i} \ldots x_{n,i}$) determining at least one point number $M_{ji}(d_2)$ which comprises all points at the time with coordinate j in interval [$x_{ji}+d_2$, $x_{ji}-d_2$], and determining at least one point number $M_{ji}(d_1)$ with coordinate j in interval [$x_{ji}+d_1$, $x_{ji}-d_1$], wherein $d=d_2-d_1$ is the width of an interval above and below coordinate ($x_{j,i}$) of point ($p_i$), b) for each point ($p_i$), determining a scaling factor $a_{ji}$ such that:

$$a_{ji}=[\log M_{ji}(d_2)-\log M_{ji}(d_1)]/[\log d_2-\log d_1],$$

c) determining for each scaling factor $a_{ji}$ a probability density $P_1(a_{ji})$, d) comparing probability densities $P_1(a_{ji})$ to at least one reference distribution of a comparison texture system without target patterns, e) if a difference between probability densities $P_1$ and said reference distribution exceeds a threshold value, identifying occurrence of a target pattern.

5. The process as claimed in claim 4, wherein each point number $M_{ji}(d_2)$ and $M_{ji}(d_1)$ comprises two partial numbers $M^+_{ji}(d_2)$, $M^-_{ji}(d_2)$ $M+_{ji}(d_1)$, and $M^-_{ji}(d_1)$ each of which comprise all points with coordinate j in the interval of width d above and below coordinate ($x_{n,i}$) wherein said steps b) through e) are performed for each of said partial numbers.

* * * * *